United States Patent [19]

Anegawa

[11] Patent Number: 4,482,162
[45] Date of Patent: Nov. 13, 1984

[54] AUTOMATIC CHUCK FOR WORKPIECES

[75] Inventor: Kazuhiro Anegawa, Osaka, Japan

[73] Assignee: Koyo Machine Industries Company, Inc., Osaka, Japan

[21] Appl. No.: 403,474

[22] Filed: Jul. 30, 1982

[30] Foreign Application Priority Data

Feb. 10, 1982 [JP] Japan ................................. 57-20177

[51] Int. Cl.³ ........................................... B23B 31/30
[52] U.S. Cl. ................................. 279/1 J; 279/1 DC; 279/1 L; 279/4; 279/119
[58] Field of Search ............... 279/1 J, 1 F, 1 L, 4, 279/119, 120, 121, 108, 122, 1 DC; 269/77, 78

[56] References Cited

U.S. PATENT DOCUMENTS

| 185,838 | 1/1877 | Saunders | 279/120 |
|---|---|---|---|
| 548,773 | 10/1895 | Cherry | 279/119 |
| 1,816,655 | 7/1931 | Ragan | 279/1 J |
| 2,470,720 | 5/1949 | Proctor | 279/119 |
| 3,338,120 | 8/1967 | Renoux | 82/5 |
| 3,364,823 | 1/1968 | Benjamin et al. | 279/4 |
| 3,456,956 | 7/1969 | Herbkersman | 279/4 |
| 3,630,535 | 12/1971 | Renoux | 279/1 J |
| 3,707,295 | 12/1972 | Vennin | 279/4 |
| 3,992,019 | 11/1976 | Crawshay | 279/121 |
| 4,249,459 | 2/1981 | Pruden | 279/4 |

FOREIGN PATENT DOCUMENTS 519389 2/1931 Fed. Rep. of Germany .......... 279/4

Primary Examiner—Z. R. Bilinsky
Assistant Examiner—Daniel W. Howell
Attorney, Agent, or Firm—Mason, Fenwick & Lawrence

[57] ABSTRACT

A chuck for a workpiece comprising an annular piston housed in the main body of the chuck, an annular adjusting member supported on a cylindrical rod portion integral with the piston and movable only radially thereof, and three clamp levers pivotably mounted on the chuck main body and arranged at an equal spacing along the circumference thereof for radially driving clamp jaws on a front plate of the main body. Each of the clamp levers has a rear end in engagement with a tapered surface on the outer periphery of the adjusting member. With the portion of the workpiece to be machined held in its centered position, another portion of the workpiece is held by the clamp jaws, and three wedge-like lock members arranged between the cylindrical rod portion and the adjusting member at an equal spacing circumferentially thereof are individually advanced to lock the adjusting member.

3 Claims, 8 Drawing Figures

AUTOMATIC CHUCK FOR WORKPIECES

BACKGROUND OF THE INVENTION

The present invention relates to a chuck for machine tools, such as lathes and cylindrical grinders, for chucking workpieces having a large diameter or a large length.

For example when a diametrically large or an elongated workpiece is to be machined by turning at an end portion or joint portion thereof, the workpiece must be attached to a chuck while being supported in suspension by a chain block or the like to center the portion of the workpiece to be machined.

The portion to be machined, if eccentric with the portion to be held by the clamp jaws of the chuck, is extremely difficult to center, necessitating much labor and time for chucking.

Further because conventional automatic chucks are so constructed that the clamp jaws are radially movable in a concentric arrangement, they are useful insofar as the portion of the workpiece to be chucked is concentric or in alignment with the portion thereof to be machined, but if otherwise, it is almost impossible to use such a chuck, or the workpiece must be centered by a very cumbersome procedure.

U.S. Pat. No. 3,338,120 discloses a thread cutting machine wherein the workpiece can be chucked as centered with eccentricity corrected. U.S. Pat. No. 3,630,535 granted Dec. 28, 1971 discloses a chuck for machine tools wherein clamp means concentric with the axis of rotation of three jaws is adapted to move three other jaws for correcting the eccentricity of a workpiece.

SUMMARY OF THE INVENTION

The present invention relates to an automatic chuck for workpieces for use in lathes, cylindrical grinders, etc.

An object of the invention is to eliminate the foregoing drawbacks and to provide an automatic chuck by which a workpiece can be chucked with the portion thereof to be machined centered in position even when the portion is eccentric with the portion to be held by the chuck.

Another object of the invention is to provide such a chuck by which the workpiece can be chucked quickly and easily.

The present invention provides an automatic chuck for workpieces which comprises a chuck main body, an annular piston housed in the chuck main body and slidable axially of the chuck by being driven by a pressure medium, an annular adjusting member supported on a cylindrical rod portion integral with the annular piston and movable only radially of the chuck, the adjusting member having a tapered outer peripheral surface, at least three clamp levers mounted on the chuck main body pivotably radially thereof and arranged at an equal spacing along the circumference thereof, each of the clamp levers having a rear end in engagement with the tapered surface of the adjusting member, clamp jaws equal in number to the number of the clamp levers and supported on a front plate of the chuck main body movably only radially thereof, the clamp levers having front ends engaged with the clamp jaws individually, at least three lock pistons housed in the chuck main body and slidable axially thereof, a wedge-like lock member attached to the rod portion of each of the lock pistons and movable forward and backward in a space between the outer peripheral surface of the annular piston rod portion and the slanting bottom surface of an axial groove formed in the inner periphery of the adjusting member, and means for selectively advancing or retracting the lock pistons.

DESCRIPTION OF THE PREFERRED EMBODIMENT

Figure 1:
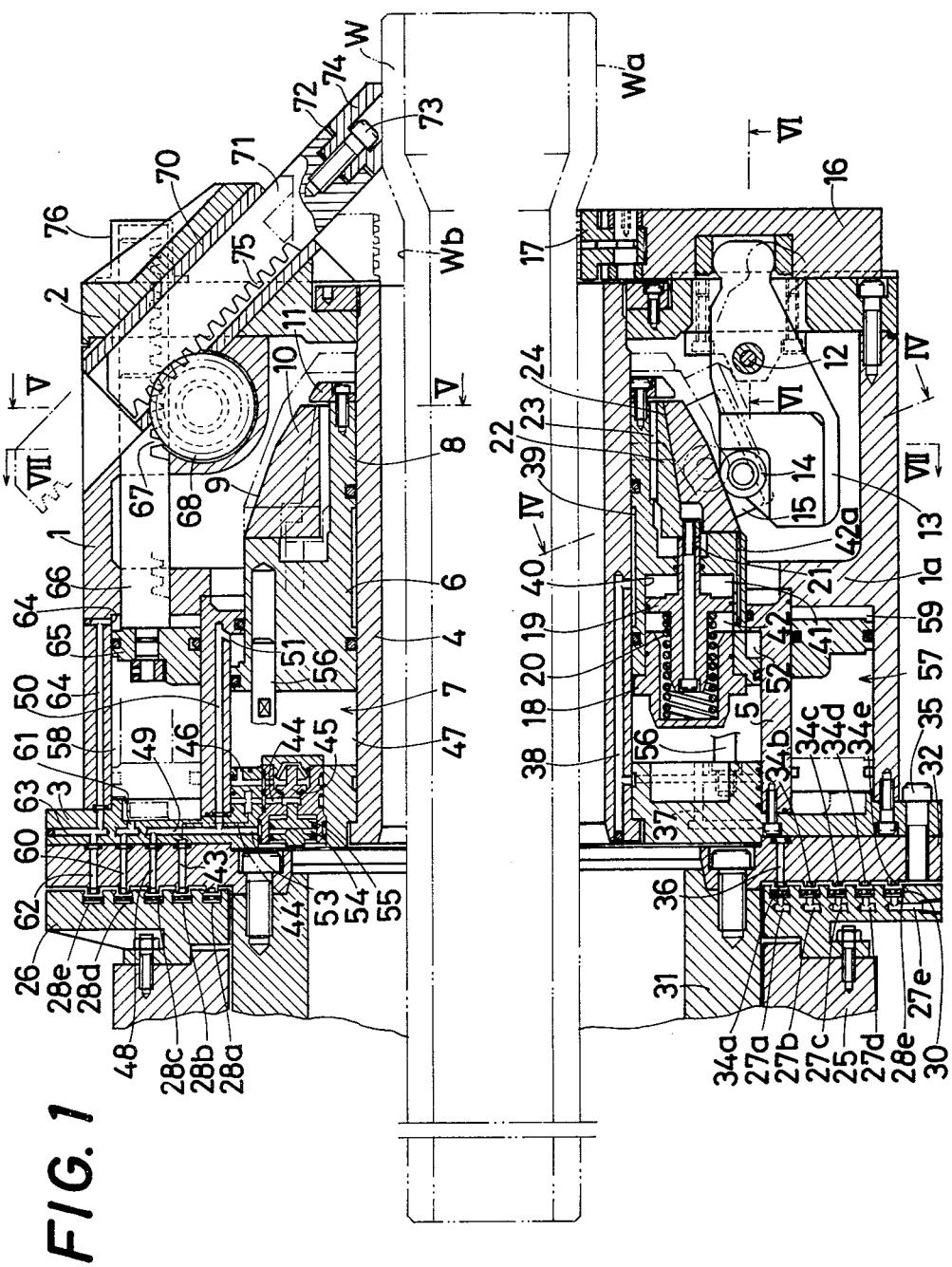
FIG. 1 is a view in vertical section of an embodiment of the invention.
Figure 2:
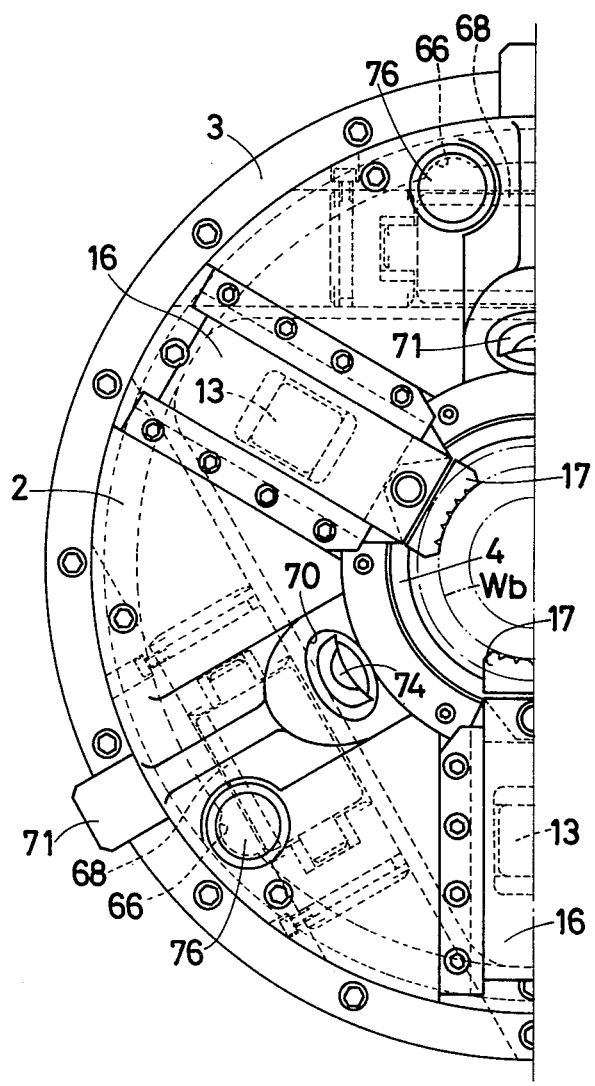
FIG. 2 is a fragmentary side elevation showing the same when chucking a workpiece completely.
Figure 3:
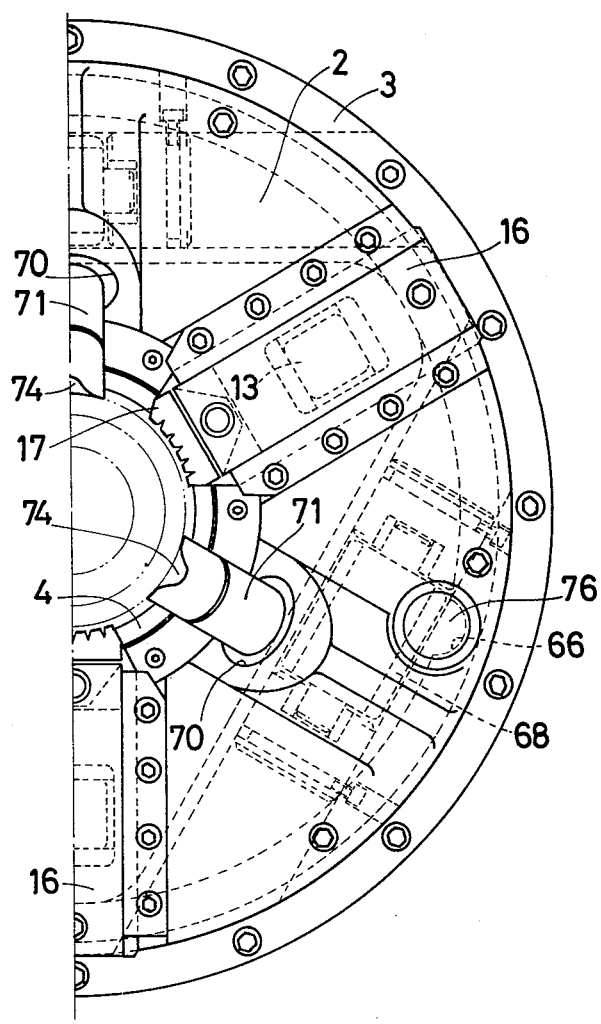
FIG. 3 is a fragmentary side elevation showing the same when holding the workpiece temporarily for centering.
Figure 4:
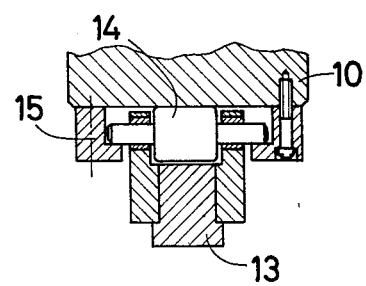
FIGS. 4, 5, 6 and 7 are views in section taken along the lines IV—IV, V—V, VI—VI and VII—VII in FIG. 1 respectively.
Figure 5:
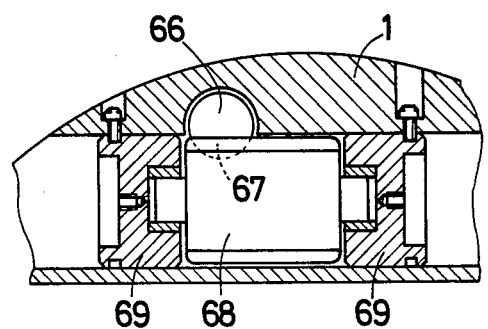
Figure 6:
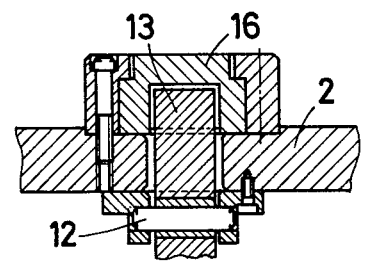
Figure 7:
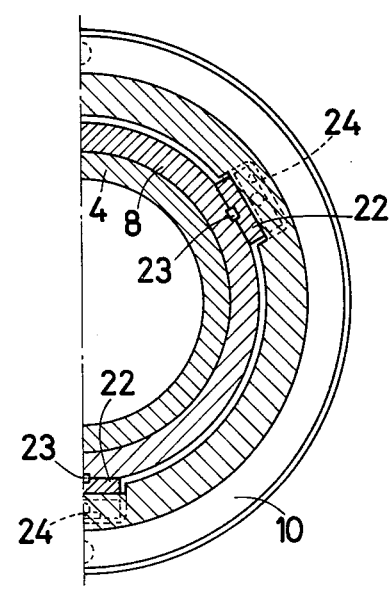
Figure 8:
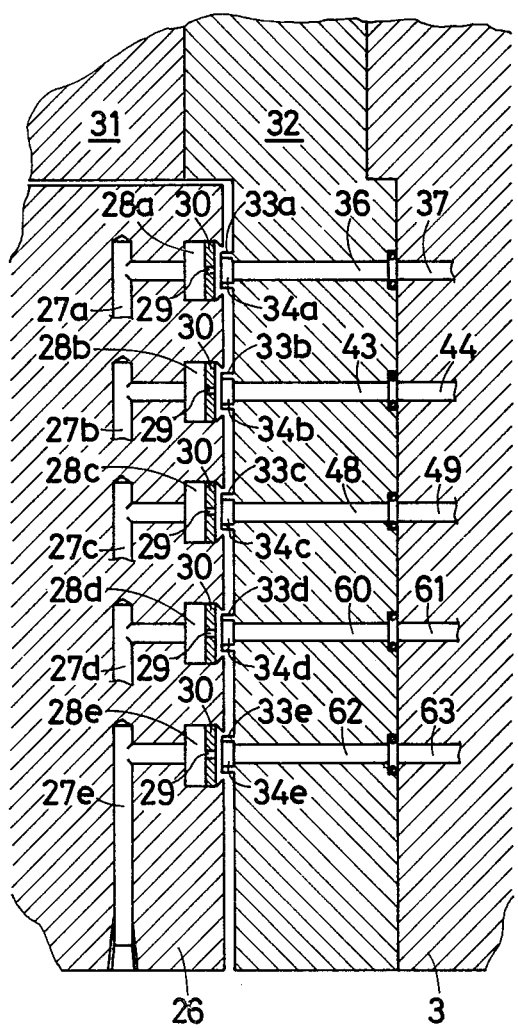
FIG. 8 is an enlarged sectional view showing an arrangement for supplying a pressure medium.

With reference to the drawings, an inner cylinder 4 arranged concentrically with a chuck main body 1 is fixed thereto by a front plate 2 and a rear plate 3. An intermediate cylinder 5 is fixed at its front and rear ends to a partition wall 1a of the main body 1 and the rear plate 3. The space between the inner cylinder 4 and the intermediate cylinder 5 serves as an annular cylinder chamber 7 having accommodated therein an annular piston 6 which is axially slidable.

A cylindrical rod portion 8 extends from the annular piston 6 in the direction from the partition wall 1a toward the front plate 2. An adjusting ring 10 having a tapered outer peripheral surface and an inside diameter larger than the outside diameter of the rod portion 8 is fitted around the rod portion 8 and is retained thereon by a support ring 11 which is secured to the front end of the rod portion 8 with bolts or the like. The adjusting ring 10 is movable relative to the annular piston 6 only radially thereof.

At least three pivots 12 positioned at right angles with the axis of the main body 1 are provided on the inner side of the front plate 2 and equidistantly spaced apart circumferentially thereof. A clamp lever 13 is supported by each pivot 12 pivotably radially of the main body and carries at its rear end a roller 14 which is held in engagement with the tapered surface 9 of the adjusting ring 10 by guide brackets 15 secured to the tapered surface 9. The clamp lever 13 has a front end projecting from the front side of the front plate 2 through a radial slit in the plate 2 and engaged with a clamp jaw member 16 supported on the front side of the front plate 2 and slidable radially thereof. Thus, at least three clamp jaw members 16 are provided. Each jaw member 16 has a clamp jaw 17 attached by a bolt or the like to the end thereof which is positioned radially inward of the chuck for holding the portion Wb of a workpiece W to be chucked.

The annular piston 6 is provided with at least three lock cylinders 18 arranged at an equal spacing along its circumference. A lock piston 19 housed in each lock cylinder 18 is biased toward the front plate 2 by a spring 20. The piston 19 is slidable by a pressure medium toward the rear plate 3 against the spring 20. The piston 19 has a rod portion 21 projecting toward the front plate 2 and provided with a wedge-like lock member 22 attached to its forward end.

The lock member 22 is supported on the cylindrical rod portion 8 of the annular piston 6 and slidable axially thereof by being guided by a key 23. Axial grooves 24 are formed in the inner periphery of the adjusting ring 10 and equidistantly spaced apart circumferentially thereof. Each of the grooves 24 has a slanting bottom in corresponding relation to the slanting surface of the wedge-like lock member 22. The lock member 22 is fitted in the axial groove 24 and is movable forward and backward.

Pressurized air is generally used as the pressure medium for operating the pistons 6 and 19. Alternatively pressure oil, hydraulic pressure or the like is usable. However, pressurized air is most suitable to use in view of the function of the chuck.

The pressure medium supply system for operating the pistons 6 and 19 by supplying pressurized air to the cylinder chambers may be known supply means as will be described below for illustrative purposes.

A fixed ring 26 secured to a spindle support 25 is formed with pressure medium supply channels 27a to 27e connected to pressure medium supply pipes (not shown). Annular grooves 28a to 28e communicating with the supply channels 27a to 27e respectively are formed in the front side of the fixed ring 26. An annular diaphragm piece 30 having a suitable number of holes 29 and made of rubber, synthetic resin or like elastic material is elastically deformably fitted in each of the grooves 28a to 28e.

One side face of a mount plate 32 for attaching the chuck to a spindle 31 is opposed to the front side of the fixed ring 26 and formed with annular ridges 33a to 33e fitting in the annular grooves 28a to 28e with a suitable clearance. The ridges 33a to 33e are formed in the projecting end faces with annular furrows 34a to 34e which are circumferentially continuous. The mount plate 32 has the rear plate 3 of the chuck main body 1 secured to the other side face thereof by bolts 35.

The annular furrow 34a of the mount plate 32 communicates with the right chambers 41 of the lock cylinders 18 through channels 36, 37, 38 formed in the mount plate 32, the rear plate 3 and the inner cylinder 4 respectively, and through a circumferential groove 39 and a channel 40 formed in the inner periphery of the annular piston 6. Each lock cylinder left chamber 42 having the spring 20 therein communicates with the atmosphere via a channel 42a.

The annular furrow 34b communicates with the left portion 47 of the annular cylinder chamber 7 through channels 43 and 44 formed in the mount plate 32 and the rear plate 3, and through a check valve 45 and a channel 46 formed in the rear plate 3. The check valve 45 serves to prevent the pressure medium supplied to the left chamber portion 47 from returning unless the valve is opened from outside.

The annular furrow 34c communicates with the right portion 52 of the annular cylinder chamber 7 through channels 48 and 49 formed in the mount plate 32 and the rear plate 3, and through a channel 50 and an opening 51 formed in the intermediate cylinder 5. The channel 49 is provided with a branch channel 53 communicating with a release cylinder chamber 54 formed in the rear plate 3 for applying the pressure medium to the rear side of a release piston 55 slidably accommodated in the chamber 54. The release piston 55 has its rod end opposed to the check valve 45 to open the valve 45 by the action of the pressure medium. Indicated at 56 in FIG. 1 is a guide bar having one end fixed to the rear plate 3 for guiding the annular piston 6 for sliding.

The annular furrows 34d and 34e communicate with the left portion 58 and right portion 59 of a cylinder chamber 57 of an automatic centering assembly through channels 60, 61 and channels 62, 63, 64, respectively.

Although not essential to the automatic chuck of the invention, the automatic centering assembly improves the function of the chuck when provided.

The centering cylinder chamber 57, which is annular, is defined by the inner periphery of the chuck main body 1 and the outer periphery of the intermediate cylinder 5 and is closed at its opposite ends with the rear plate 3 and the partition wall 1a. The chamber 57 has accommodated therein an annular centering piston 65 which is axially slidable.

The centering piston 65 is provided with at least three rods 66 extending through the partition wall 1a toward the front plate 2 and arranged at an equal spacing along the circumference of the plate. Each of the rods 66 has a rack 67 meshing with a pinion 68 rotatably supported on the main body 1 and positioned at right angles with the axis of the body 1. Indicated at 69 are bearings for the pinion 68.

On the other hand, at least three centering rods 71 are supported by bushes 70 on the front plate 2. Each of the rods 71 is slidable in an oblique direction intersecting the axis of the chuck. The centering rod has at its forward end a centering jaw 74 attached thereto by a shim 72 and a bolt 73 and obliquely movable forward and backward with respect to the front plate 2. The centering rod 71 has a rack 75 meshing with the pinion 68. A cover 76 is attached to the front plate 2 for the rod 66.

For example, a tubular pipe will be chucked by the following procedure for machining a joint portion by a lathe.

It is now assumed that the centering jaws 74 of the automatic centering assembly are in a retracted position inside the front plate 2 by being retracted by the centering piston 65.

When a pressure medium is supplied to the annular groove 28a through the supply channel 27a, the pressure elastically deforms the annular diaphragm piece 30 to fit the piece intimately to the end face of the annular ridge 33a of the mount plate 32, permitting the medium to flow into the annular furrow 34a. Consequently the medium flows through the channels 36, 37, 38, the groove 39 and the channel 40 into the right chambers 41 of the lock cylinders 18, moving the lock pistons 19 leftward with the lock members 22 against the springs 20 to unlock the adjusting ring 10.

Simultaneously with this, the pressure medium is supplied from the channel 27c. (Since all the annular diaphragm pieces 30 function in the same manner as above, the diaphragm pieces will not be described). The medium flows through the channels 48, 49, 50 and the opening 51 into the right portion 52 of the annular cylinder chamber 7 and partly through the branch channel 53 into the release cylinder chamber 54. The release piston 55 therefore moves rightward, causing the rod end to push the check valve 45 and bring the left portion 47 of the annular cylinder chamber 7 into communication with the atmosphere via the channels 46, 44, 43 and the annular furrow 34b. (When no pressure medium is supplied to the annular grooves 28a to 28e, the annular diaphragm pieces 30 are away from the end faces of the annular ridges 33a to 33e of the mount plate 32 due to the elasticity, so that the furrows 34a to 34e are in communication with the atmosphere, each through the clearance in the annular groove around the annular ridge and through the clearance between the mount plate 32 and the fixed ring 26.) As a result, the annular piston 6 is moved leftward with the adjusting ring 10 by the medium supplied to the right chamber portion 52. This causes the guide brackets 15 on the tapered surface 9 of the adjusting ring 10 to move the clamp levers 13 from the solid-line positon in FIG. 1 to the phantom-line position shown, thereby causing the clamp jaw members 16 to retract the clamp jaws 17 radially outward. When the supply of the medium to the channel 27c is discontinued, the right chamber portion 52 communicates with the atmosphere as already stated to stop the leftward movement of the annular piston 6, consequently stopping the radially outward movement of the clamp jaws 17. Thus the clamp jaws 17 can be stopped at the desired position.

With the chuck in this state, the workpiece W (pipe) is inserted into the spindle 31 from the rear (or from the front) and positioned in the specified work position by an unillustated stopper or the like. The workpiece can be positioned in place by any desired method.

The pressure medium is supplied from the channel 27d to the left portion 58 of the centering cylinder chamber 57 through the channels 60 and 61 to move the centering piston 65 rightward. Accordingly each centering rod 71 coupled to the centering piston 65 by the racks 67, 75 and the piston 68 is driven from the phantom-line position in FIG. 1 to the solid-line position shown, whereby the centering jaws 74 are advanced forward from the front plate 2 to temporarily hold the portion Wa of the workpiece W to be machined at three locations along its circumference and automatically center the portion Wa. The positions of the centering jaws 74 of the automatic centering assembly are properly adjusted in advance by the shims 72 or the like.

On completion of the centering by temporary holding, the pressure medium is supplied from the channel 27b to the left portion 47 of the annular cylinder chamber 7 through the channels 43, 44, the check valve 45 and the channel 46, moving the annular piston 6 rightward. The adjusting ring 10 moving with the piston 6 therefore turns the clamp levers 13 from the phantom-line position in FIG. 1 toward the solid-line position by the rollers 14 provided at the lever rear ends and bearing on the tapered surface 9 of the ring 10. The levers 13 in turn move the clamp jaws 17 radially inward through the clamp jaw members 16. At this time, the adjusting ring 10 is radially movable on the rod portion 8 of the annular piston 6. If the portion Wb of the workpiece W to be clamped is eccentric with the portion Wa to be machined, one of the three clamp jaws 17 strikes against the portion Wb and is thereby prevented from moving radially inward, whereupon the ring 10 moves radially, driving the other two clamp jaws 17 toward the portion Wb. As a result, the three clamp jaws 17 hold the workpiece W completely with a uniform force. Generally with workpieces W, the portion Wa to be machined is slightly eccentric or out of alignment with the portion Wb to be held or chucked. However, after the portion Wa has been centered, the workpiece W, even if involving whatever eccentricity, can be chucked properly with the portion Wa retained in its centered position, by virtue of the provision of the adjusting ring 10 which is radially movable as above. When the portion Wb to be clamped is deformed, the clamp jaw(s) may be changed suitably for chucking.

After the workpiece W has been firmly held by the clamp jaws 17, the supply of the pressure medium from the channel 27a is discontinued, whereupon the right chambers 41 of the lock cylinders 18 are brought into communication with the atmosphere through the channels concerned. Consequently each spring 20 forces the lock piston 19 rightward and advances each lock member 22 into the space between the outer periphery of the annular piston rod portion 8 and the slanting bottom surface of the axial groove 24 in the inner periphery of the adjusting ring 10 to lock the ring 10 on the rod portion 8. Because the three lock pistons 19 provided in the annular piston 6 as equidistantly spaced apart along its circumference are biased by springs 20 individually, the ring 10 is locked in the position in which the workpiece W is clamped firmly, irrespective of whether or not the ring 10 is positioned concentrically with the annular piston 6. The pressure medium supplied to the left portion of the cylinder chamber 7, applying back pressure to the check valve 45, holds the valve 45 closed. Accordingly even when the supply of the pressure medium to the channel 27b is discontinued after the workpiece has been clamped completely, the annular piston 6 is retained in the position of complete clamping or chucking. Further with the adjusting ring 10 locked in this position by the lock members 22, the workpiece is not released from the clamping force of the clamp jaws 17.

After the workpiece has been completely chucked, the supply of the pressure medium to the supply channel 27b as well as to the supply channel 27d is stopped, while the pressure medium is supplied to the supply channel 27e. Consequently the left portion 58 of the centering cylinder chamber 57 comes into communication with the atmosphere through the channels 60 and 61, while the medium is supplied to the right chamber portion 50 via the channels 62, 63 and 64, moving the centering piston 65 leftward. This moves the centering rods 71 from the solid-line position in FIG. 1 to the phantom-line position shown by means of the racks 67, 75 and the pinions 68 to retract the centering jaws 74 inwardly of the front plate 2, whereupon the supply of the medium to the channel 27e is discontinued. With the pressure medium supplied to none of the channels 27a to 27e and therefore with the annular diaphragm pieces 30 positioned away from the annular ridges 33a to 33e of the mount plate 32, the chuck is rotatable for the machining of the workpiece portion Wa.

After the portion Wa has been machined as required, the pressure medium is supplied to the channel 27c to cause the release piston 55 to open the check valve 45 and supply the medium to the right portion 52 of the cylinder chamber 7. This moves the annular piston 6 leftward with the adjusting ring 10, turning the clamp levers 13 from the solid-line position in FIG. 1 to the phantom-line position shown by means of the guide brackets 15 and the rollers 14 to release the workpiece W from the clamp jaws 17. The completed workpiece is removed from the chuck rearward (or forward) through the spindle 31.

Thus the present invention provides an automatic chuck by which a workpiece can be clamped with the portion thereof to be machined retained in its centered position after the portion has been centered. Since the adjusting ring 10 is movable radially for clamping, the workpiece can be chucked very accurately even if the portion thereof to be clamped is eccentric with the portion to be machined. Accordingly the workpiece can be chucked quickly with great ease. When the adjusting ring 10 is adapted to be locked concentrically with the annular piston 6, the workpiece can be chucked by driving the annular piston 6 only without supplying the pressure medium to the right lock cylinder chamber portions 41, such that when the portion of the workpiece to be machined is in alignment with the portion thereof to be clamped, the workpiece can be set in place without the centering step.

If the pressure medium is likely to leak from the fitting portions of parts or other portions, O-rings, etc. may be used for sealing at such portions.

When an elongated workpiece projects rearward from the spindle support over a large distance and is likely to deflect during rotation, a roller stand may be used therefor. Alternatively another chuck of the same construction as above may be attached to the spindle at the rear end of the spindle support for holding the workpiece in the same manner as above. Any desired control means may be used for supplying the pressure medium to the supply channels by switching the piping system concerned.

What is claimed is:
1. An automatic chuck for a workpiece comprising:
 (a) a chuck main body;
 (b) an inner cylinder fixed to the chuck main body by a front plate and a rear plate concentrically therewith;
 (c) an intermediate cylinder fixed between a partition wall of the chuck main body and the rear plate concentrically with the chuck main body;
 (d) an annular piston slidable axially of the chuck main body provided between the intermediate cylinder and the inner cylinder;
 (e) at least three lock cylinders arranged at an equal spacing along the circumference of the annular piston;
 (f) an annular adjusting member supported on a cylindrical rod portion integral with the annular piston projecting toward the front plate and movable at least by an amount of eccentricity of a workpiece, and having a tapered outer peripheral surface;
 (g) at least three clamp levers mounted on the chuck main body pivotably radially thereof and arranged at an equal spacing along the circumference thereof, each of the clamp levers having a rear end in engagement with the tapered surface of the adjusting member;
 (h) clamp jaws equal in number to the number of the clamp levers and supported on the front plate movably only radially thereof, the clamp levers having front ends engaged with the clamp jaws individually;
 (i) lock pistons housed in the annular piston slidably axially thereof; and
 (j) a wedge-like lock member attached to the rod portion of each of the lock pistons and movable forward and backward in a space between the outer peripheral surface of the annular piston rod portion and the slanting bottom surface of an axial groove formed in the inner periphery of the adjusting member.

2. An automatic chuck as defined in claim 1, further comprising at least three lock pistons housed in the annular piston slidably axially thereof, a wedge-like lock member attached to one rod portion of each of the lock pistons and movable forward and backward in a space between the outer peripheral surface of the annular piston rod portion and the slanting bottom surface of an axial groove formed in the inner periphery of the adjusting member, a spring housed in the lock cylinder for biasing the lock piston toward the adjusting member opposite the wedge-like lock member, whereby a pressure medium is fed to the cylinder chamber opposite the spring for retracting the lock piston and the wedge-like lock member.

3. An automatic chuck as defined in claim 1, further comprising a centering piston housed between the inner periphery of the chuck main body and the intermediate cylinder slidably axially of the chuck main body, at least three rods provided in the centering piston in axial parallel with the chuck main body, pinions equal in number to the piston rods provided rotatably in the chuck main body, centering rods equal in number to the piston rods provided slidably in the chuck main body and operating in the front plate of the chuck main body in an oblique direction intersecting the axis thereof for reciprocating the centering jaws attached to the forward ends of the centering rods from the interior of the chuck main body toward the center of the front, a rack meshing with the pinion provided in each of the rods and centering rods for interlocking the centering piston and the centering rod through the rod and the pinion.

* * * * *